United States Patent [19]

Mizuno et al.

[11] Patent Number: 4,833,108

[45] Date of Patent: May 23, 1989

[54] SINTERED BODY OF ALUMINUM NITRIDE

[75] Inventors: Shinya Mizuno, Seto; Shusei Kuratani; Kohichi Uno, Nagoya; Hisashi Sakuramoto; Satoshi Nishiyama, both of Nagoya, all of Japan

[73] Assignee: Narumi China Corporation, Nagoya, Japan

[21] Appl. No.: 173,184

[22] Filed: Mar. 24, 1988

[30] Foreign Application Priority Data

Mar. 28, 1987 [JP] Japan .................................. 62-75619
Jun. 23, 1987 [JP] Japan ................................. 62-156198
Jun. 25, 1987 [JP] Japan ................................. 62-158332

[51] Int. Cl.$^4$ ............................................. C04B 35/58
[52] U.S. Cl. ......................................... 501/98; 501/96
[58] Field of Search ..................................... 501/96, 98

[56] References Cited

U.S. PATENT DOCUMENTS

| | | | |
|---|---|---|---|
| 3,108,887 | 10/1963 | Lenie et al. | 501/98 |
| 4,435,513 | 3/1984 | Komeya et al. | 501/98 |
| 4,540,673 | 9/1985 | Takeda et al. | 501/96 |
| 4,578,232 | 3/1986 | Huseby et al. | 501/98 |
| 4,627,815 | 12/1986 | Aldinger et al. | 501/96 |

FOREIGN PATENT DOCUMENTS

| | | | |
|---|---|---|---|
| 0207465 | 7/1987 | European Pat. Off. . | |
| 3337630 | 4/1985 | Fed. Rep. of Germany | 501/98 |
| 59-207882 | 11/1984 | Japan . | |
| 60-71575 | 4/1985 | Japan . | |
| 61-270263 | 11/1986 | Japan . | |
| 62-153173 | 7/1987 | Japan . | |

Primary Examiner—William R. Dixon, Jr.
Assistant Examiner—Anthony J. Green
Attorney, Agent, or Firm—Flynn, Thiel, Boutell & Tanis

[57] ABSTRACT

Sintered bodies of aluminum nitride are produced by adding, as a sintering aid, an oxide mixture consisting essentially of calcium oxide, yttrium oxide and one or more oxides of tungsten oxide and molybdenum oxide or a mixture of compounds (precursors) capable of being converted into said oxide mixture by firing to aluminum nitride as a main component in such proportions that total amounts of the sintering aid is in the range 0.1 to 20% by weight (calculated as oxides of CaO, $Y_2O_3$, $WO_3$ and $MoO_3$) based on the sum of the weight as the oxide forms of the sintering aid and aluminum nitride, molding the resulting composition and sintering the molded composition. The composition can be sintered at relatively low temperature. The black sintered bodies thus obtained are especially useful as materials for insulating substrate, heat sink, packaging for semiconductor device, etc. due to their high density and good thermal conductivity.

11 Claims, 7 Drawing Sheets

W: WHITE FINE PARTICLES
A: AEN PARTICLES
Y.G.X.= GRAIN BOUNDARIES

SINTERED BODY OF ALUMINUM NITRIDE

BACKGROUND OF THE INVENTION

1. Field of the Invention

The present invention relates to sintered bodies of aluminum nitride used as materials for insulating substrates, heat sinks, packages for semiconductor devices, etc. More specifically, the present invention relates to sintered bodies of aluminum nitride having a high density and a high thermal conductivity which can be produced at reduced sintering temperatures.

2. Description of the Prior Art

In recent years, with an increasing trend toward the high integration and high densification of LSI, there has been a great demand for insulating substrate materials having a good thermal conductivity. Heretofore, sintered alumina has been most widely used as a material for an insulating substrate. However, since the alumina substrate has a low thermal conductivity (about 20 W/m.K) and has a large thermal expansion coefficient as compared to silicon, it has many problems such as poor bondability, etc. Therefore, sintered bodies of aluminum nitride (AlN) which have a good thermal conductivity and a thermal expansion coefficient approaching that of silicon have attracted a great interest. In addition to these advantages, the aluminum nitride sintered bodies possess a high mechanical strength (40-50 kg/mm$^2$) and good electrical properties, for example, a small dielectric constant However, since aluminum nitride materials are poor in sinterability due to their strong covalent bond, it is difficult to obtain high density sintered bodies.

For this reason, various ways of achieving high density sintered bodies of aluminum nitride have been tried up to date and, for example, there may be mentioned a hot press sintering method and a normal pressure sintering method, both methods using a sintering aid. The hot press sintering method is unfavorable because of poor productivity. In the normal pressure method, sintering aids, such as compounds of rare earth or alkaline earth elements have been used and sintered bodies of aluminum nitride having a high density and a high thermal conductivity have been obtained. However, such a known method requires high sintering temperatures exceeding 1800° C. and is unfavorable from the viewpoint of productivity.

On the other hand, as means for improving productivity, Japanese patent application laid-open No. 61-117160 discloses a method for producing a low temperature sintered body of aluminum nitride in which rare earth oxide and alkaline earth oxide are added in combination. This method tends to cause unevenness in sintering and coloration and can not still provide satisfaction in thermal conductivity. Further, sintered bodies of aluminum nitride with a high thermal conductivity and a production method thereof are described in Japanese Patent Application laid-open Nos. 61-270 262 and 61-270 263, the sintered bodies consisting of boride or carbide of Groups 4a, 5a or 6a elements of the Periodic Table and aluminum nitride.

In such circumstances, further improvements have been needed in order to obtain higher thermal conductivity.

Previously, Inventors have found that addition of CaMoO$_4$ and/or CaWO$_4$ enables sintering at low temperature, as described in Japanese Patent Application No. 61-270 39, substantially corresponding to U.S. Ser. No. 118,192. However, the thermal most, on the order of about 100 W/m.K, as referred to in the other above Japanese Patent Application Laid-open Nos. 61-117 160, 61-270 262 and 61-270 263.

Also, as a method recently proposed, addition of TiO$_2$ or ZrO$_2$ in combination with Sc$_2$O$_3$ is described in Japanese Patent Application Laid-open No. 62-72 570. However, this method is economically unfavorable in view of the use of expensive Sc$_2$O$_3$ and the thermal conductivity of the resulting sintered bodies is at most about 100 W/m.K.

SUMMARY OF THE INVENTION

Therefore, an object of the present invention is to provide a sintered body of aluminum nitride having a high density and a high thermal conductivity.

Another object of the present invention is to provide such a sintered body of aluminum nitride which can be obtained by sintering at relatively low temperatures.

According to the present invention, there is provided a sintered body of aluminum nitride which is produced by adding, as a sintering aid, an oxide mixture consisting essentially of calcium oxide, yttrium oxide and one or more oxides of tungsten oxide and molybdenum oxide or a mixture of compounds (precursors) capable of being converted into the foregoing oxide mixture by firing to aluminum nitride as a main component in such proportions that the total amount of the sintering aid is in the range of 0.1 to 20% by weight (calculated as oxides of CaO, Y$_2$O$_3$, WO$_3$ and MoO$_3$) based on the sum of the weight as the oxides of the sintering aid and aluminum nitride, molding the resulting composition and sintering the molded composition.

DETAILED DESCRIPTION OF THE PREFERRED EMBODIMENTS

The present invention will be now described in detail hereinunder.

Inventors' studies have started from the finding that addition of $CaMoO_4$, $CaWO_4$ or $Ca_3WO_6$ to AlN makes it possible to sinter at reduced temperatures and, after extensive experimentation, have found that when the composition of $CaMoO_4$, $CaWO_4$ or $Ca_3WO_6$ is used in combination with $Y_2O_3$, there can be obtained an aluminum nitride sintered body having a high density and high thermal conductivity without adversely affecting the low-temperature sinterability. Besides such a finding, it has been also found that when a combination of CaO and $MoO_3$ or a combination of CaO and $WO_3$ or a mixture of these combination is added in proportions outside the composition of $CaMoO_4$, $CaWO_4$ or $Ca_3WO_6$ together with $Y_2O_3$ to AlN, the resulting AlN sintered bodies have a high thermal conductivity and a high density without affecting unfavorably the above low-temperature sinterability.

Aluminum nitride powder containing not greater than 3% of oxygen may be preferably used in the present invention.

As examples of calcium compounds used as the sintering aid of the present invention, there may be mentioned CaO or calcium compounds, such as $CaCO_3$, $Ca(NO_3)_2 \cdot 4H_2O$ or $CaC_2O_4 \cdot H_2O$, which can be eventually converted to the CaO by firing. As the yttrium compounds, there may be mentioned $Y_2O_3$ or compounds, such as $Y_2CO_3$, $Y(NO_3)_3$, $Y(CH_3COO)_3$, or $Y(C_2O_4)_3$, which can be eventually converted to $Y_2O_3$ by firing. $MoO_3$ or Mo compounds (e.g., $H_2MoO_4$) capable of being converted to $MoO_3$ by firing may be used as the sintering aid. Also, composite compounds such as $CaMoO_4$ or $Ca_3MoO_6$ can be employed, while it is uncertain whether they yield oxides of the respective constituent metal elements by firing. Examples of tungsten compounds used in the present invention include $WO_3$ and tungsten compounds (e.g., $H_2WO_4$) capable of being converted to $WO_3$ by firing. Needless to say, composite compounds such as $CaWO_4$ or $Ca_3WO_6$ may be also employed, although it is uncertain whether they yield oxides of the respective metals.

Aluminum nitride and the sintering aids set forth above are preferably employed in the form of small powder having an average particle diameter of not more than 10 μm, preferably not more than 5 μm. In the present invention, for the sake of convenience, the sintering aids are described as sintering aid powder, but the terms includes also liquid sintering aids are included in the invention.

When the aforementioned sintering aids, i.e. CaO or other calcium compounds (hereinafter referred merely as "Ca sintering aid"), $Y_2O_3$ or other yttrium compounds ("Y sintering aid"), $MoO_3$ or other molybdenum compounds ("Mo sintering aid") and $WO_3$ or other tungsten compounds ("W sintering aid") are added in total amounts of less than 0.1% by weight calculated in terms of CaO, $Y_2O_3$, $MoO_3$ and $WO_3$, the effects of these sintering aids can not be sufficiently achieved. On the other, an excess addition of the sintering aids exceeding 20% by weight in total detrimentally affects the properties of the resulting sintered bodies. For example, such an excess addition leads to reduction in the density and the thermal conductivity. Thus, the sintering aids are preferably added in a total amount of 0.1 to 20% by weight as the, calculated CaO, $Y_2O_3$, $MoO_3$ and $WO_3$, based on the total weight of aluminum nitride and the sintering aids, calculated at the oxides. The minimum amount of each sintering aid is 0.03% for $Y_2O_3$, 0.02% for CaO and 0.05% for $WO_3$ and/or $MoO_3$ and the total of the sintering aids is at least 0.1% by weight.

Addition of the sintering aids is minimized in the required amounts, depending on the production abilities of the used apparatus and the properties required in the resulting sintered bodies, and such amounts are in the range of 0.2 to 15 % by weight. In aluminum nitride compositions intended to be sintered at sintering temperatures not exceeding 1800° C., the mixing ratio of the respective sintering aids is determined depending on the properties required in the intended sintered bodies.

More specifically, in order to obtain black aluminum nitride sintered bodies which are needed for the use as semiconductor packaging materials or the like, the foregoing Ca, Y, Mo and W sintering aids are added in such proportions that the total amount of the Mo sintering aid and the W sintering aid preferably ranges from 10 to 90% by weight, more preferably 20 to 80% by weight (calculated in terms of $MoO_3$ and $WO_3$), based on the total amounts of the sintering aids of Ca, Y, Mo and W, calculated in terms of oxides (i.e., CaO, $Y_2O_3$, $MoO_3$ and $WO_3$). On a basis of the sum of the weight of the aluminum nitride powder and the weight as the foregoing oxide forms of the sintering aids, the total amount as $MoO_3$ and $WO_3$ of the Mo and W sintering aids is preferably not less than 0.1% by weight and more preferably not less than 0.3 % by weight. When the amounts of these sintering aids stray from this range, the resulting sintered products do not show black color and sintering can not be sufficiently effected.

In order to obtain aluminum nitride sintered bodies having a high thermal conductivity, the amount of the Y sintering aid, calculated as $Y_2O_3$, is preferably in the ranges of 5 to 90 % by weight and more preferably in the range of 20 to 80 % by weight, when the total weight of the sintering aids, calculated in terms of CaO, $Y_2O_3$, $MoO_3$ and $WO_3$, is taken as 100% by weight. Further, the remaining sintering aids (i.e., Ca sintering aid, Mo sintering aid and W sintering aid) are added in such proportions (as CaO, $MoO_3$ and $WO_3$) that the weight ratio of $CaO:(MoO_3+WO_3)$ is preferably from 9:1 to 1:9 and more preferably from 4:1 to 1:4. Further, when the sum of the aluminum nitride powder and the sintering aids (as the foresaid oxide forms) is taken as 100% by weight, the amount of the Y sintering aid, calculated as $Y_2O_3$, is preferably in the range of 0.5% by weight to 7% by weight, and more preferably in the range of 1 to 5% by weight. When the amount of the Y sintering aid falls outside the range, the desired high thermal conductivity can not be achieved and sintering can not be sufficiently achieved.

Further, in order to achieve sintered bodies having a desired combination of uniform black color and high thermal conductivity, an overlapping range between the ranges specified above may be employed and the mimimum content of each component in the resulting sintered body is 0.5% for $Y_2O_3$, 0.05% for CaO and 0.3% for $WO_3$ and/or $MoO_3$ and the total amount of the sintering aids is at least 0.85%.

Besides the aforesaid sintering aids, other components, for example, compounds of Ti, Zr, Fe, etc., may be added or included. Also, carbon or its compound may be included as an incidental component. Needless to say, the addition or inclusion of these components is permitted only within the ranges which do not detrimentally affect sinterability and other properties required in the sintered bodies.

The reason why the sintered bodies of aluminum nitride according to the present invention have an improved thermal conductivity and a low-temperature sinterability is not yet certain. However, the following assumption is possible. With respect to the low-temperature sinterability, it is assumed that $CaO-Al_2O_3$ system and $MoO_3$ (or $WO_3$)-$Al_2O_3$ system composite compounds having a low melting temperature are formed during the firing process and these compounds make possible the reduction of the sintering temperature. With respect to the high thermal conductivity, metallic Mo and W, $Y_2O_3$-$Al_2O_3$ compound and $CaO$-$Al_2O_3$ compound, etc., were detected in the sintered body in our X-ray diffraction studies. Based on the experimental data, it is possible to assume that oxygen is released from $MoO_3$ or $WO_3$ during the sintering process and bonds to aluminum component to form $Al_2O_3$. The thus formed $Al_2O_3$ is converted, for example, to $Y_2O_3$-$Al_2O_3$ and thereby is fixed a grain boundary components. The thermal conductivity of the sintered body may also change depending on the ratio of CaO to ($WO_3+MoO_3$), but the reason for this is not fully understood.

Figure 1:
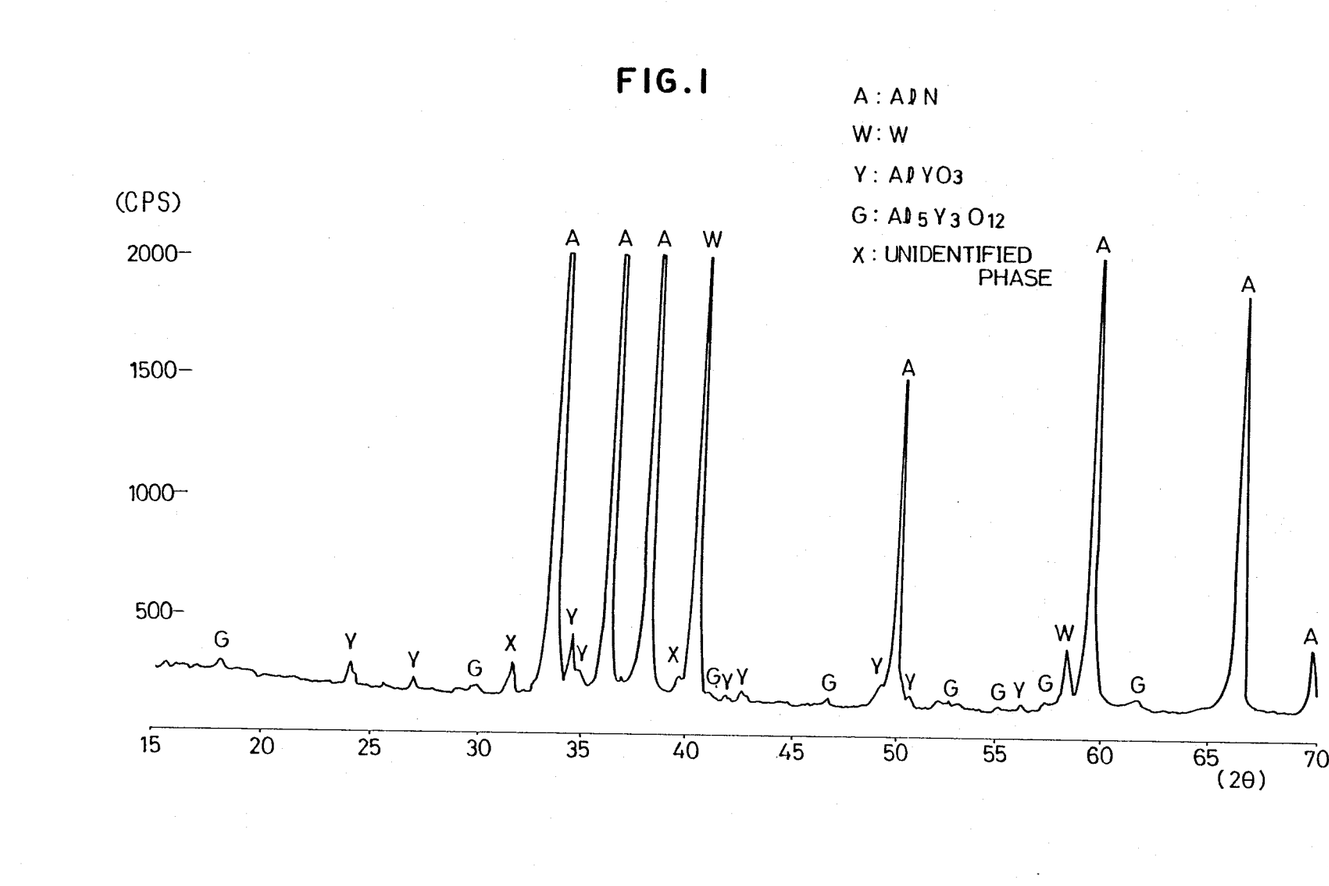
FIG. 1 shows the results of an X-ray diffraction analysis of the aluminum nitride sintered body according to the present invention.
Figure 2:
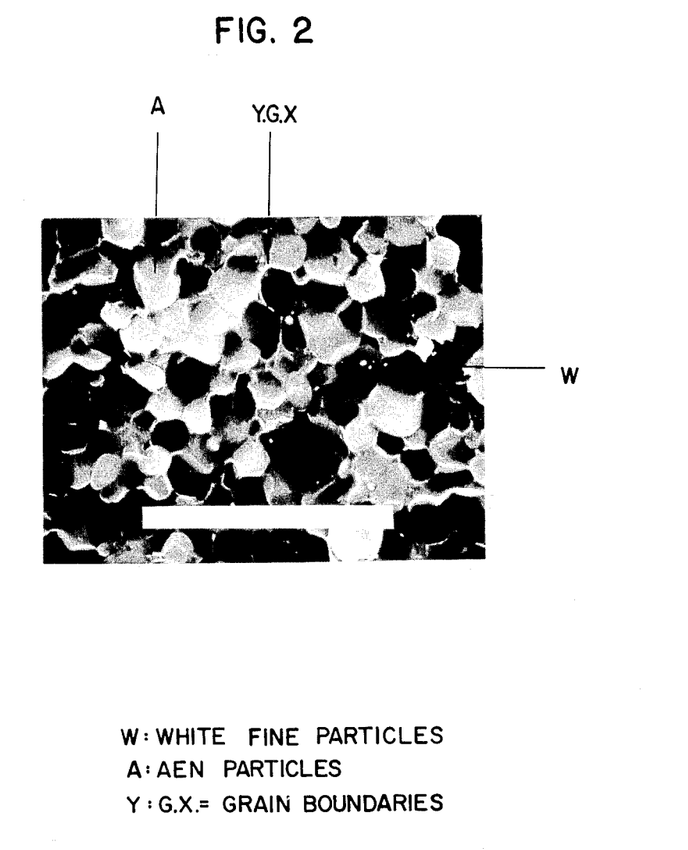
FIG. 2 is an electron micrograph showing the microstructure of the cross section of the sintered body set forth in FIG. 1.

FIG. 1 shows the results of the X-ray diffraction analysis and FIG. 2 is an electron micrograph of the sintered body of the present invention in which W sintering aid was used with Ca and Y sintering aids. As can be seen from these figures, the sintered body includes aluminum nitride ("A" in FIG. 1 and black, gray or white large grains in FIG. 2), metallic tungsten ("W" in FIG. 1 and white spherical fine grains in FIG. 2), and aluminum oxide containing rare earth elements ("Y" and "G" in FIG. 1 and white grain boundary phase of aluminum and yttrium composite oxide in FIG. 2) as main components and further unidentified components (unidentified phase "X" in FIG. 1) which are assumed as composite aluminum oxides containing alkaline earth and rare earth elements. As a further identified component, alkaline earth aluminum oxide is considered to be present in the sintered body. Although these figures are the experimental results for the W sintering aid, similar data can be also obtained using the Mo sintering aid.

In the process for producing the sintered bodies of the present invention, sintering should be performed in a nonoxidizing atmosphere, for example, in an atmosphere of nitrogen gas, argon gas, helium gas, carbon monoxide gas, hydrogen gas, ammonia gas or a mixed gas thereof or in a vacuum. Particularly, an atmosphere of nitrogen gas is preferable. Sintering temperature is generally in the range of 1500 to 2100° C. and may preferably be in the range of 1550 to 1800° C. Sintering is ordinarily conducted by a normal pressure sintering process but it can be also conducted under reduced pressure or by hot-press sintering.

The present invention will now be described in detail with reference to Examples and Comparative Examples. In the Tables below, unless otherwise indicated, the amounts of sintering aids used in Examples and Comparative Examples are all given in percent by weight (calculated as CaO, $Y_2O_3$, $WO_3$ and $MoO_3$) on the basis of the sum of the weight, calculated as the oxides, of sintering aids and aluminum nitride.

COMPOSITION 1

(Example of the Present Invention) 1.0% by weight as CaO of calcium carbonate powder, 3.5% by weight of $Y_2O_3$ powder and 0.5% by weight of tungstic acid anhydride ($WO_3$) powder were added to aluminum nitride powder having an average particle diameter of 2 μm and containing 1.7% by weight of oxygen as an impurity and mixed together. Then, the resulting mixture was mixed with 2% by weight of a binder based on the weight of the mixture of the aluminum nitride and the sintering aids and granulated. The obtained mixture was molded under a pressure of about 1200 kg/cm² at room temperature to give a molded body with a diameter of about 25 mm and a thickness of about 5 mm. The molded body was heated to a temperature of 600° C. and held at that temperature for five hours in an atmosphere of nitrogen gas to remove the binder. Then, the body was placed in a boron nitride crucible sand a sintered body of aluminum nitride was obtained by normal pressure sintering at 1700° C. for three hours. The properties of the sintered body thus obtained are given as Composition No. 1 in Table 1 below.

COMPOSITIONS 2-14

(Examples of the Present Invention)

Figure 3:
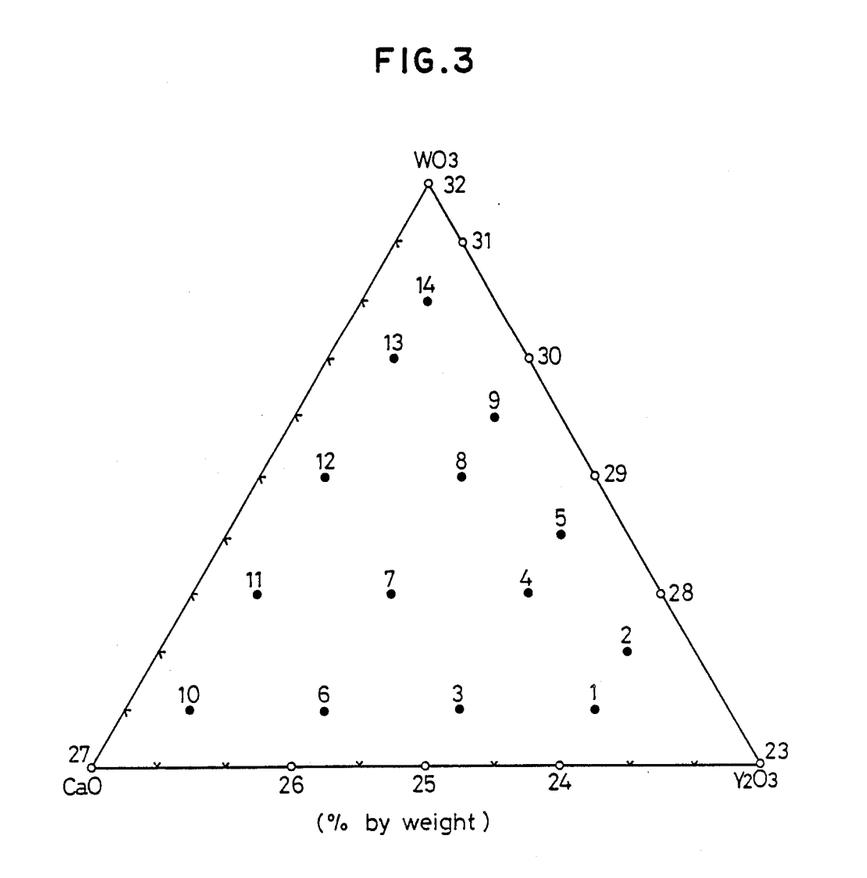
FIG. 3 is a composition diagram showing proportions of ingredients of sintering aids used in Compositions 1 to 14 of the present invention and Compositions 23 to 32 of Comparative Examples.

$Y_2O_3$ powder, $CaCO_3$ powder and $WO_3$ powder were mixed in the proportions (calculated as CaO, $Y_2O_3$, and $WO_3$) as shown in FIG. 3 and were added in a total amount of 5.0% by weight (as CaO, $Y_2O_3$, and $WO_3$) to the aluminum nitride powder used in Composition 1. Sintered bodies of aluminum nitride were obtained from the respective compositions in the same manner as described in Composition 1.

The properties of the resulting sintered bodies are shown as Composition Nos. 2-14 in Table 1.

COMPOSITIONS 15-20

(Examples of the Present Invention)

50% by weight of $Y_2O_3$ powder, 20% by weight as CaO of $CaCO_3$ powder and 30% by weight of $WO_3$ powder were mixed to provide a powder mixture of the sintering aids. The mixture was added in given amounts to the aluminum powder employed in Composition 1 and sintered bodies were obtained in the same manner as described in Composition 1. The added amounts of the powdered mixture of the sintering aids and the properties of the sintered bodies thus obtained are shown in Table 1.

COMPOSITIONS 21-22

(Examples of the Present Invention)

A mixture of 2.5% by weight of $Y_2O_3$ powder and 2.5% by weight of $Ca_3WO_6$ (Composition 21) or a mixture of 3.5% by weight of $Y_2O_3$ powder and 1.5% by weight of $CaWO_4$ (Composition 22) was added to the aluminum nitride powder used in Composition 1. The percentages as $Y_2O_3$, CaO and $WO_3$ are given in Table 1. In accordance to the same procedure as set forth in Composition 1, the resulting mixtures were molded and the binder component was removed. The thus treated mixtures were put into a crucible of aluminum nitride and sintered bodies of aluminum nitride were obtained by normal pressure sintering at a temperature 1700° C. for 15 hours in an atmosphere of nitrogen. The properties of the aluminum nitride sintered bodies thus obtained are given in Table 1.

COMPOSITIONS 23-32

(Comparative Examples)

Sintering aids having compositions shown as Nos. 23 to 32 in FIG. 3 were added in total amounts as their oxides of 5.0% by weight to the aluminum nitride powder employed in Composition 1 and comparative sintered bodies of aluminum nitride were obtained in the same way as set forth in the above Examples. The properties of the sintered bodies thus obtained are given in Table 1 (Compositions Nos. 23 to 32).

With respect to Compositions 2, 4 and 13 and Comparative Compositions 24 and 29, further studies were made by changing the sintering temperatures, as shown in Table 2. The properties of the sintered bodies thus obtained are given in Table 2.

As is apparent from Table 2, the sintered bodies according to the present invention were sufficiently densified and had a high thermal conductivity even when sintering was performed at 1650° C.

Figure 4:
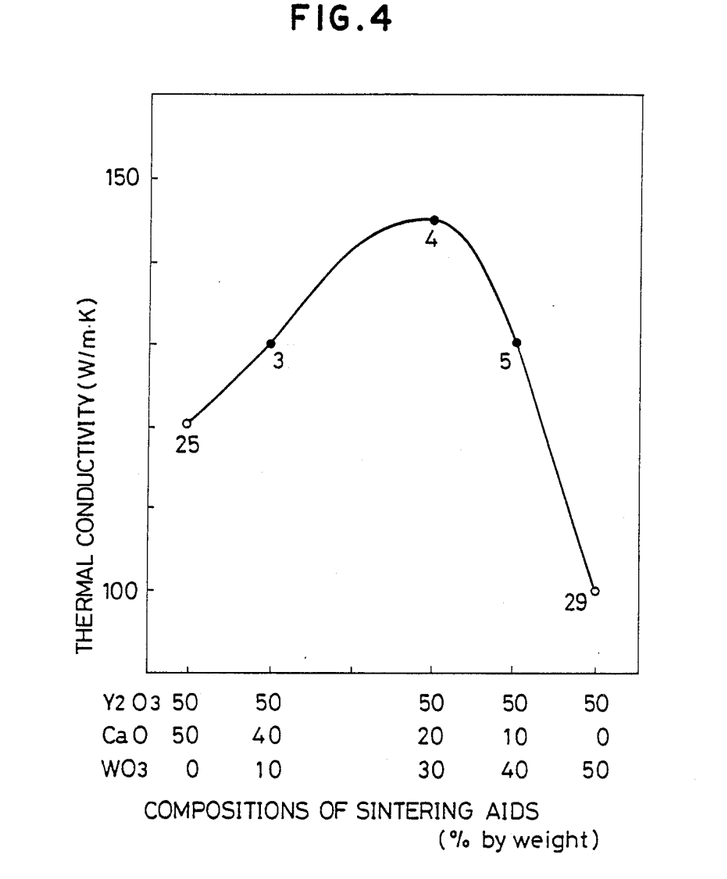
FIG. 4 is a graph illustrating the relationship between the ratio of CaO:WO$_3$ and the thermal conductivity of aluminum nitride sintered bodies for Compositions 3, 4 and 5 according to the present invention and Compositions 25 and 29 (Comparative Examples)
Figure 5:
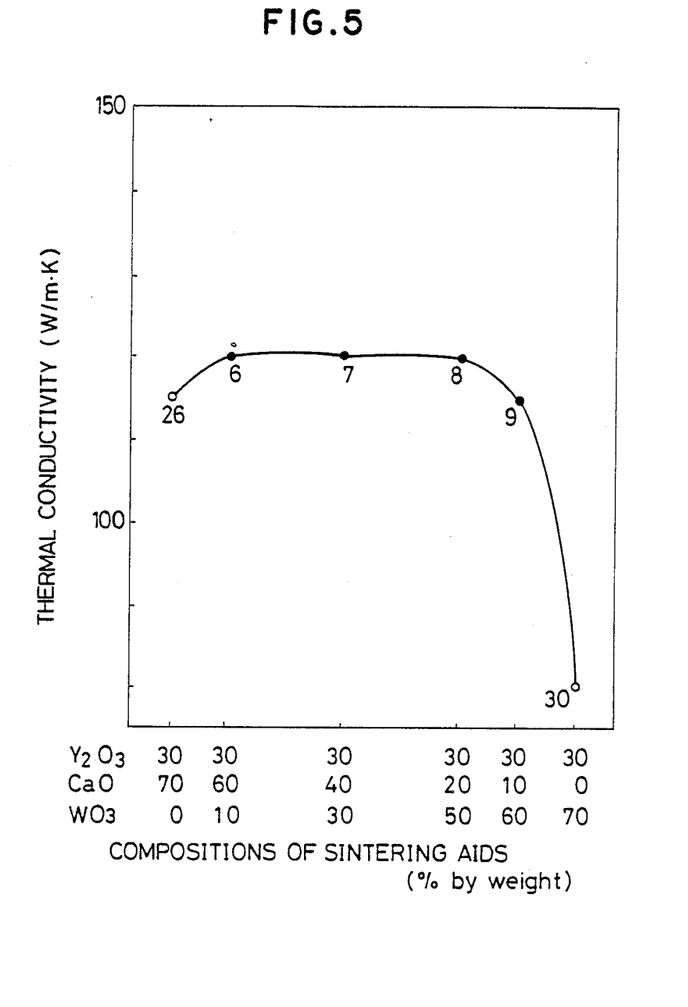
FIG. 5 a graph illustrating the relationship between the ratio of CaO:WO$_3$ and the thermal conductivity of aluminum nitride sintered bodies for Compositions 6, 7, 8 and 9 according to the present invention and Compositions 26 and 30 (Comparative Examples)

In FIG. 3, percentages of $Y_2O_3$ of the sintering aids lying on a line joining 25 and 29 and the sintering aids lying on a line joining 26 to 30 are constant for each line. Using these sintering aid compositions, the dependence on $CaO:WO_3$ ratio of thermal conductivity was examined and the results are shown in FIGS. 4 and 5. It can be seen from these figures that thermal conductivity can be improved in the $CaO : WO_3$ ratio ranging from 9:1 to 1:9. Particularly, as can be seen from FIG. 4, a very high thermal conductivity is achieved in Composition 4 having a $CaO : WO_3$ molar ratio of about 3 : 1 and it is assumed that at this ratio $Ca_3WO_6$ is formed during the firing process and the thus formed $Ca_3WO_6$ makes a great contribution to the increase of the thermal conductivity.

In Tables 1 and 2, the mark "O" at the column "Color" shows sintered bodies having a good black appearance and blank shows sintered bodies having a different color, such as white, gray or dark gray, or unevenly black-colored sintered bodies.

TABLE 1

| Composition No. | Amounts of sintering aids (by wt. %) | | | Sintering conditions | | Density g/cc | Color | Thermal conductivity W/m.K |
| --- | --- | --- | --- | --- | --- | --- | --- | --- |
| | $Y_2O_3$ | CaO | $WO_3$ | Firing temperature °C. | Holding time Hr. | | | |
| Examples of the Invention | | | | | | | | |
| 1 | 3.5 | 1.0 | 0.5 | 1700 | 3 | 3.29 | O | 145 |
| 2 | 3.5 | 0.5 | 1.0 | 1700 | 3 | 3.32 | O | 145 |
| 3 | 2.5 | 2.0 | 0.5 | 1770 | 3 | 3.26 | O | 130 |
| 4 | 2.5 | 1.0 | 1.5 | 1700 | 3 | 3.29 | O | 145 |
| 5 | 2.5 | 0.5 | 2.0 | 1700 | 3 | 3.30 | O | 130 |
| 6 | 1.5 | 3.0 | 0.5 | 1700 | 3 | 3.20 | O | 120 |
| 7 | 1.5 | 2.0 | 1.5 | 1700 | 3 | 3.26 | O | 120 |
| 8 | 1.5 | 1.0 | 2.5 | 1700 | 3 | 3.29 | O | 120 |
| 9 | 1.5 | 0.5 | 3.0 | 1700 | 3 | 3.32 | O | 115 |
| 10 | 0.5 | 4.0 | 0.5 | 1700 | 3 | 3.18 | O | 105 |
| 11 | 0.5 | 3.0 | 1.5 | 1700 | 3 | 3.19 | O | 110 |
| 12 | 0.5 | 2.0 | 2.5 | 1700 | 3 | 3.23 | O | 110 |
| 13 | 0.5 | 1.0 | 3.5 | 1700 | 3 | 3.29 | O | 110 |
| 14 | 0.5 | 0.5 | 4.0 | 1700 | 3 | 3.32 | O | 100 |
| 15 | 0.1 | 0.04 | 0.06 | 1700 | 3 | 3.22 | | 95 |
| 16 | 0.5 | 0.2 | 0.3 | 1700 | 3 | 3.27 | O | 130 |
| 17 | 1.0 | 0.4 | 0.6 | 1700 | 3 | 3.27 | O | 135 |
| 18 | 3.0 | 1.2 | 1.8 | 1700 | 3 | 3.31 | O | 140 |
| 19 | 5.0 | 2.0 | 3.0 | 1700 | 3 | 3.36 | O | 130 |
| 20 | 7.0 | 2.8 | 4.2 | 1700 | 3 | 3.41 | O | 115 |
| 21*1 | 2.5 | 1.0 | 1.5 | 1700 | 15 | 3.30 | O | 165 |
| 22*2 | 3.5 | 0.3 | 1.2 | 1700 | 15 | 3.31 | O | 170 |
| Comparative Examples | | | | | | | | |
| 23 | 5.0 | — | — | 1700 | 3 | 2.80 | | 60 |
| 24 | 3.5 | 1.5 | — | 1700 | 3 | 3.27 | | 130 |
| 25 | 2.5 | 2.5 | — | 1700 | 3 | 3.26 | | 120 |
| 26 | 1.5 | 3.5 | — | 1700 | 3 | 3.19 | | 115 |
| 27 | — | 5.0 | — | 1700 | 3 | 2.95 | | 55 |
| 28 | 3.5 | — | 1.5 | 1700 | 3 | 3.07 | O | 90 |
| 29 | 2.5 | — | 2.5 | 1700 | 3 | 3.22 | O | 100 |
| 30 | 1.5 | — | 3.5 | 1700 | 3 | 3.24 | | 80 |
| 31 | 0.5 | — | 4.5 | 1700 | 3 | 3.15 | O | 65 |
| 32 | — | — | 5.0 | 1700 | 3 | 2.60 | | 35 |

Remark:
*1 2.5% by weight of $Y_2O_3$ and 2.5% by weight of $Ca_3WO_6$
*2 3.5% by weight of $Y_2O_3$ and 1.5% by weight of $CaWO_4$

TABLE 2

| Composition No. | Sintering conditions | | Density g/cc | Color | Thermal conductivity W/m.K |
| --- | --- | --- | --- | --- | --- |
| | Firing temperature °C. | Holding time Hr. | | | |
| Examples of the Invention | | | | | |
| 2 | 1650 | 3 | 3.28 | O | 125 |
| | 1700 | 3 | 3.32 | O | 145 |
| | 1750 | 3 | 3.32 | O | 150 |
| 4 | 1650 | 3 | 3.27 | O | 115 |
| | 1700 | 3 | 3.29 | O | 145 |
| | 1750 | 3 | 3.29 | O | 155 |
| 13 | 1650 | 3 | 3.28 | O | 105 |
| | 1700 | 3 | 3.29 | O | 110 |
| | 1750 | 3 | 3.30 | O | 115 |
| Comparative Examples | | | | | |
| 24 | 1650 | 3 | 2.30 | | — |
| | 1700 | 3 | 3.27 | | 130 |
| 29 | 1650 | 3 | 2.54 | | — |
| | 1700 | 3 | 3.22 | O | 100 |
| | 1750 | 3 | 3.33 | O | 130 |

COMPOSITION 33

(Example of the Present Invention)

1.0% by weight as CaO of calcium carbonate powder, 3.5% by weight of $Y_2O_3$ powder and 0.5% by weight of molybdic acid anhydride ($MoO_3$) powder were added to aluminum nitride powder having an average particle diameter of 2 μm and containing 1.7% by weight of oxygen as an impurity and mixed together. Then, the resulting mixture was mixed with 2% by weight of a binder based on the sum of the weight of the aluminum nitride and the weight (as oxides) of the sintering aids and granulated. The obtained mixture was molded under a pressure of about 1200 kg/cm² at room temperature to give a molded body with a diameter of about 25 mm and a thickness of about 5 mm. The molded body was heated to a temperature of 600° C. and held at this temperature for five hours in an atmosphere of nitrogen gas to remove the binder. Then, the body was placed in a boron nitride crucible and a sintered body of aluminum nitride was obtained by normal pressure sintering at 1700° C. for three hours in an atmosphere of nitrogen to provide a sintered body of aluminum nitride. The properties of the sintered body are given as Composition No. 33 in Table 3 below.

COMPOSITIONS 34-55

(Examples of the Present Invention)

Figure 6:
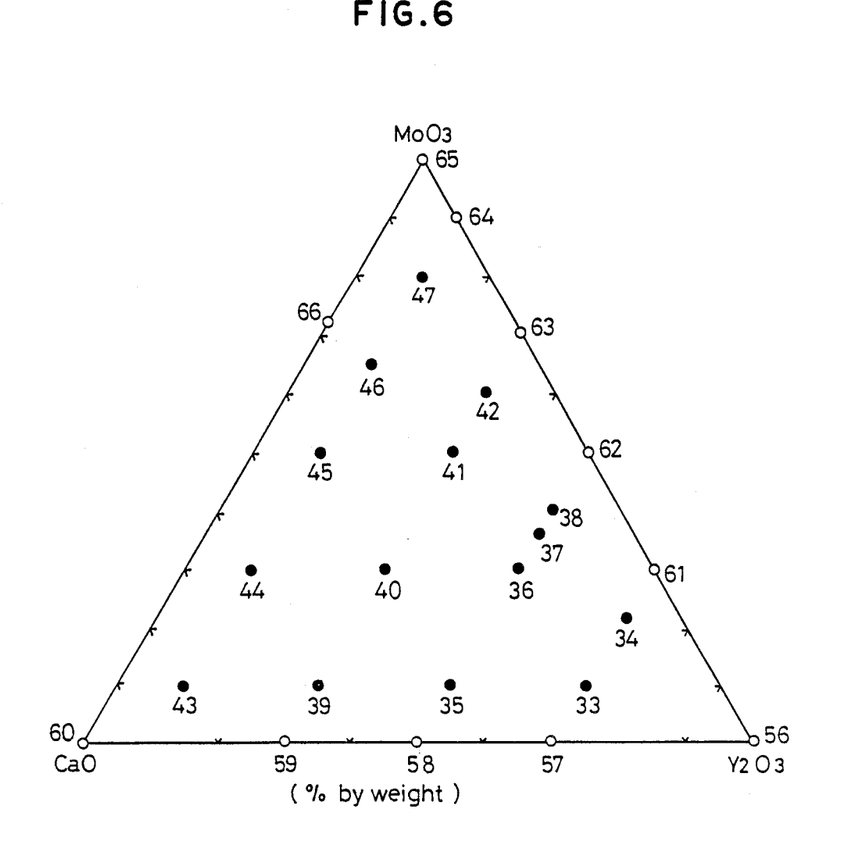
FIG. 6 is a composition diagram showing proportions of ingredients of sintering aids used in Compositions 33 to 47 of the present invention and Compositions 56 to 66 of Comparative Examples.

$Y_2O_3$ powder, $CaCO_3$ powder and $MoO_3$ powder or $CaMoO_4$ powder were added in quantities (calculated as CaO, $Y_2O_3$, and $MoO_3$) as given in Table 3 to the aluminum nitride powder used in Composition 33 and sintered bodies of aluminum nitride were obtained in the same manner as described in Composition 33. With respect to Compositions 34, 37 and 46, $CaMoO_4$ powder and $Y_2O_3$ powder were mixed in amounts (in terms of $Y_2O_3$, CaO and $MoO_3$) as shown in FIG. 6. In Compositions 35, 36, 38 to 45 and 47, $Y_2O_3$ powder and $CaCO_3$ powder and $MoO_3$ powder were used in proportions shown in FIG. 6. Numbers (33 to 47) shown in FIG. 6 correspond to the numbers of the Compositions in Table 3, respectively, and the sintering aids were added in a total amount of 5.0% by weight (as CaO, $Y_2O_3$, and $MoO_3$).

In Compositions 48 to 55, sintering aids were added in proportions shown in Table 3. Compositions 52 to 55 are sintered bodies employing $MoO_3$ in combination with $WO_3$.

The properties of the resulting sintered bodies are shown as Composition Nos. 34–55 in Table 3.

COMPOSITIONS 56-66

(Comparative Examples)

Sintering aids having compositions shown as Nos. 56 to 66 in FIG. 6 were added in total amounts of 5.0% by weight to the aluminum nitride powder used in Composition 33 and comparative sintered bodies of aluminum nitride were obtained in the same way as set forth in the above Examples. The properties of the sintered bodies thus obtained are given in Table 3 (Composition Nos. 56 to 66).

With respect to Compositions 36 and 40 and Comparative Compositions 58 and 59, further studies were made by changing the sintering temperatures, as shown in Table 4. The properties of the sintered bodies thus obtained are given in Table 4.

As is apparent from Table 4, the sintered bodies according to the present invention were sufficiently densified and had a high thermal conductivity even when sintering was performed at 1650° C.

Figure 7:
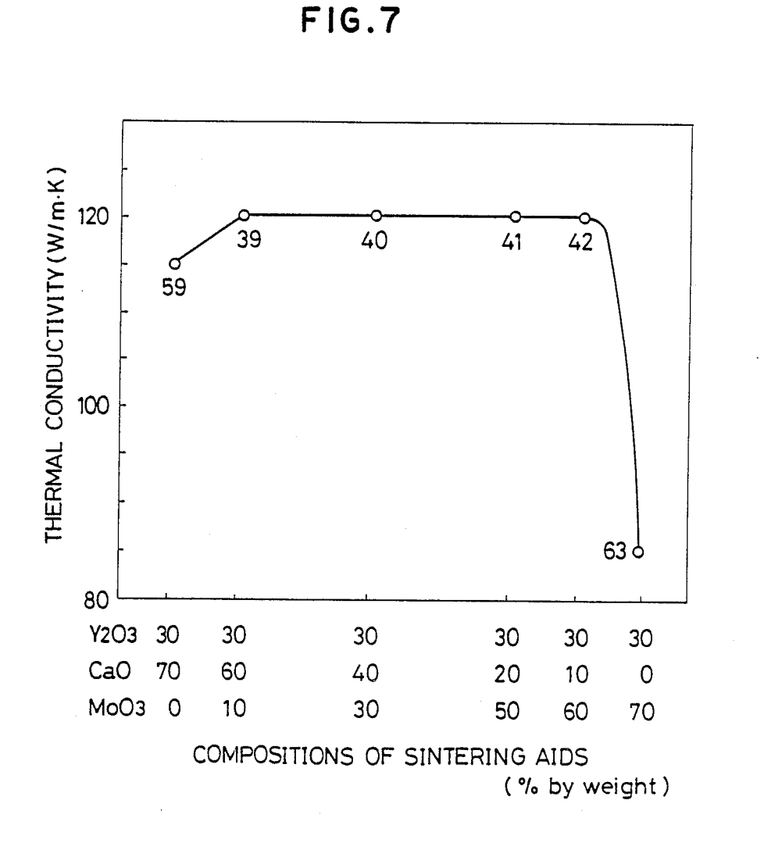
FIG. 7 is a graph illustrating the relationship between the ratio of CaO:MoO$_3$ and the thermal conductivity of aluminum nitride sintered bodies for Compositions 39 to 42 according to the present invention and Compositions 59 and 63 (Comparative Examples).

In FIG. 6, percentages of $Y_2O_3$ in sintering aids lying on a line joining 59 and 63 are the same and using these sintering aids, the dependence of thermal conductivity on the ratio of $CaO:MoO_3$ ratio was examined and the results are shown in FIG. 7.

It can be seen from these figures that thermal conductivity can be improved when the $CaO:MoO_3$ ratio is within the range of 9:1–1:9.

In Tables 3 and 4, external appearance of the resulting sintered bodies are indicated as referred to in Tables 1 and 2.

TABLE 3

| Composition No. | Amounts of sintering aids (by wt. %) | | | | Sintering conditions | | Density g/cc | Color | Thermal conductivity W/m.K |
|---|---|---|---|---|---|---|---|---|---|
| | $Y_2O_3$ | CaO | $MoO_3$ | $WO_3$ | Firing temperature °C. | Holding time Hr. | | | |
| Examples of the Invention | | | | | | | | | |
| 33 | 3.5 | 1.0 | 0.5 | | 1700 | 3 | 3.29 | O | 135 |
| 34*1 | 3.5 | 0.42 | 1.08 | | 1700 | 3 | 3.31 | O | 140 |
| 35 | 2.5 | 2.0 | 0.5 | | 1700 | 3 | 3.28 | O | 125 |
| 36 | 2.5 | 1.0 | 1.5 | | 1700 | 3 | 3.29 | O | 125 |
| 37*2 | 2.5 | 0.7 | 1.8 | | 1700 | 3 | 3.30 | O | 130 |
| 38 | 2.5 | 0.5 | 2.0 | | 1700 | 3 | 3.31 | O | 120 |
| 39 | 1.5 | 3.0 | 0.5 | | 1700 | 3 | 3.23 | O | 120 |
| 40 | 1.5 | 2.0 | 1.5 | | 1700 | 3 | 3.25 | O | 120 |
| 41 | 1.5 | 1.0 | 2.5 | | 1700 | 3 | 3.30 | O | 120 |
| 42 | 1.5 | 0.5 | 3.0 | | 1700 | 3 | 3.30 | O | 120 |
| 43 | 0.5 | 4.0 | 0.5 | | 1700 | 3 | 3.15 | O | 100 |
| 44 | 0.5 | 3.0 | 1.5 | | 1700 | 3 | 3.23 | O | 115 |
| 45 | 0.5 | 2.0 | 2.5 | | 1700 | 3 | 3.25 | O | 115 |
| 46*3 | 0.5 | 1.25 | 3.25 | | 1700 | 3 | 3.28 | O | 105 |
| 47 | 0.5 | 0.5 | 4.0 | | 1700 | 3 | 3.30 | O | 105 |
| 48 | 1.0 | 0.04 | 0.06 | | 1700 | 3 | 3.27 | | 125 |
| 49 | 1.0 | 0.4 | 0.6 | | 1700 | 3 | 3.27 | O | 120 |
| 50 | 1.0 | 2.0 | 3.0 | | 1700 | 3 | 3.28 | O | 130 |
| 51 | 1.0 | 4.0 | 10.0 | | 1700 | 3 | 3.38 | O | 95 |
| 52 | 1.0 | 1.0 | 0.75 | 0.75 | 1700 | 3 | 3.27 | O | 130 |
| 53 | 3.0 | 1.2 | 0.9 | 0.9 | 1700 | 3 | 3.31 | O | 140 |
| 54 | 5.0 | 2.0 | 1.5 | 1.5 | 1700 | 3 | 3.36 | O | 130 |
| 55 | 1.0 | 2.0 | 1.5 | 1.5 | 1700 | 3 | 3.27 | O | 120 |
| Comparative Examples | | | | | | | | | |

TABLE 3-continued

| Composition No. | Amounts of sintering aids (by wt. %) | | | | Sintering conditions | | Density g/cc | Color | Thermal conductivity W/m.K |
|---|---|---|---|---|---|---|---|---|---|
| | $Y_2O_3$ | CaO | $MoO_3$ | $WO_3$ | Firing temperature °C. | Holding time Hr. | | | |
| 56 | 5.0 | | | | 1700 | 3 | 2.80 | | 60 |
| 57 | 3.5 | 1.5 | | | 1700 | 3 | 3.27 | | 130 |
| 58 | 2.5 | 2.5 | | | 1700 | 3 | 3.26 | | 120 |
| 59 | 1.5 | 3.5 | | | 1700 | 3 | 3.19 | | 115 |
| 60 | | 5.0 | | | 1700 | 3 | 2.95 | | 55 |
| 61 | 3.5 | | 1.5 | | 1700 | 3 | 2.87 | | #1 |
| 62 | 2.5 | | 2.5 | | 1700 | 3 | 2.85 | | #1 |
| 63 | 1.5 | | 3.5 | | 1700 | 3 | 3.23 | O | 85 |
| 64 | 0.5 | | 4.5 | | 1700 | 3 | 3.17 | O | 70 |
| 65 | | | 5.0 | | 1700 | 3 | 2.49 | | #1 |
| 66*4 | | 1.4 | 3.6 | | 1700 | 3 | 3.33 | O | 100 |

Remark:
*1 3.5% by weight of $Y_2O_3$ and 1.5% by weight of $CaMoO_4$
*2 2.5% by weight of $Y_2O_3$ and 2.5% by weight of $CaMoO_4$
*3 0.5% by weight of $Y_2O_3$ and 4.5% by weight of $CaMoO_4$
*4 5% by weight of $CaMoO_4$
1 unmeasurable due to large deformation

TABLE 4

| Composition No. | Sintering conditions | | Density g/cc | Color | Thermal conductivity W/m.K |
|---|---|---|---|---|---|
| | Firing temperature °C. | Holding time Hr. | | | |
| Examples of the Invention | | | | | |
| 36 | 1650 | 3 | 3.28 | O | 120 |
| | 1700 | 3 | 3.29 | O | 125 |
| 40 | 1650 | 3 | 3.23 | O | 115 |
| | 1700 | 3 | 3.25 | O | 120 |
| Comparative Examples | | | | | |
| 58 | 1650 | 3 | 3.11 | | 115 |
| | 1700 | 3 | 3.26 | | 120 |
| 59 | 1650 | 3 | 3.13 | | 110 |
| | 1700 | 3 | 3.19 | | 115 |

In the following Examples, composite oxides such as $CaWO_4$, $Ca_3WO_6$ or $CaMoO_4$ were used as sintering aids.

COMPOSITION 67

(Example of the Present Invention)

4.0% by weight of calcium tungstate ($CaWO_4$) powder and 1.0% by weight yttrium oxide powder were added to aluminum nitride powder having an average particle diameter of 2 μm and admixed. Then, the resulting mixture was molded under a pressure of about 1200 kg/cm² at room temperature to give a molded body and then fired at a temperature of 1700° C. for three hours in an atmosphere of nitrogen gas to provide a sintered body of aluminum nitride.

The sintered body thus obtained was dense, had an excellent light-shielding ability and showed black color. The density and the thermal conductivity of the sintered body were measured and the results are given in Table 5 below.

A green sheet having the same composition as Composition 67 was formed using a doctor blade and was fired at 1700° C. in an atmosphere of a mixed gas of nitrogen and hydrogen. There was obtained a black sintered aluminum nitride substrate substantially free of warpage.

COMPOSITIONS 22, 68-73

(Examples of the Present Invention)

Alkaline earth tungstate powder ($CaWO_4$) and rare earth oxide powder were mixed and were added in appropriate proportions to the aluminum nitride powder used in Composition 67 so as to obtain Compositions 22, 68 to 73. Sintered bodies of aluminum nitride were obtained from the resulting mixtures in the same way as set forth in the above Example 67 except that sintering was conducted at 1600° to 1800° C.

Density and thermal conductivity were measured for the respective sintered bodies. The results obtained are shown in Table 5, together with the kind and amounts of the used sintering aids, the sintering conditions and the color of the respective sintered bodies.

As can be seen from Table 5, the sintered bodies of Compositions 22 and 67 to 73 had a good black appearance free of uneven sintering and uneven coloration and this is due to a uniform dispersion of metallic tungsten fine particles in the resulting sintered bodies. Further, since the sintered bodies had a high volume resistivity of at least $10^{12}$ ohm.cm, they are desirable as insulating materials. Further, when tungsten conductors are bonded onto the unsintered bodies of Compositions 22 and 67 to 73 by co-firing process, there could be obtained conductors having a much higher electrical conductivity without forming tungsten boride which is formed in the conventional aluminum nitride sintered body contains boride.

COMPOSITIONS 74

(Example of the Present Invention) 4.0% by weight of $Ca_3WO_6$ powder and 0.1% by weight of $Y_2O_3$ powder were added aluminum nitride powder with 2 μm in average particle diameter and the obtained mixture was molded under a pressure of about 1200 kg/cm² at room temperature. The molded body was fired at 1700° C. for three hours in an atmosphere of nitrogen to provide a sintered body of aluminum nitride.

The sintered body thus obtained was dense and had a superior light-shielding ability and an excellent surface smoothness. Further, it had a good black color. The density and thermal conductivity of the sintered body were measured and the results given in Table 5.

COMPOSITIONS 21, 75-91

(Examples of the Present Invention)

$Ca_3WO_6$ powder and $Y_2O_3$ powder were added in amounts shown in Table 5 to the aluminum nitride powder employed in Composition 74 and there could be obtained sintered bodies by sintering at temperatures shown in Table 5 in accordance with the same procedure described in Composition 74.

Density and thermal conductivity were measured for the respective sintered bodies. The results obtained are shown in Table 5, together with the color of the respective sintered bodies.

The sintered body exhibited good electrical insulating properties (volume resistivity of at least $10^{12}$ ohm.cm).

In the above Compositions, a comparison of the thermal conductivities of Compositions 21 and 81 indicates that the holding time at a firing temperature considerably affects thermal conductivity. Namely, both Compositions contains the same amounts of $Ca_3WO_6$ (2.5%) and $Y_2O_3$ (2.5%) and their firing temperatures are both 1700° C. However, the holding times at the firing temperatures are different (i.e., 15 hours for Composition 21 and 3 hours for Composition 81)and this difference leads to the different results in their thermal conductivity (i.e., 165 and 145). Low thermal conductivity of Composition 91 is due to the low firing temperature of 1550° C. Further, in comparison of the thermal coductivities of Compositions 67 and 78 in which $Y_2O_3$ powder was used in the same amount (1.0%) and sintering conditions (1700° C.×3 hours) were the same, it becomes apparent that $CaWO_4$ results in a higher thermal conductivity than $Ca_3WO_6$.

Composition 92

(Comparative Example)

A comparative sintered body was prepared in the same way described in Composition 67 except that tungsten oxide powder was added in an amount of 3.0% by weight to the aluminum nitride powder used in Composition 67 and sintering was conducted at 1900° C. The sintered body thus obtained was black in color and its thermal conductivity was as low as 55 W/m.K.

COMPOSITION 93

(Comparative Example)

A comparative sintered body was prepared in the same way as described in Composition 67 except that yttrium oxide powder was added in an amount of 5.0% by weight to the aluminum nitride powder used in Composition 67 and sintering was conducted at 1800° C. The sintered body thus obtained had a light transmitting property and light brown in color. In some portions, uneven coloration was observed.

COMPOSITION 94

(Comparative Example)

A comparative sintered body was prepared in the same way as set forth in Composition 67 except that 4.0% by weight of tungsten oxide powder and 5.0% weight of yttrium oxide powder were added to the aluminum nitride powder used in Composition 67 and firing was conducted at 1700° C. The sintered body thus obtained was not dense.

Composition 95

(Comparative Example)

A comparative sintered body was prepared in the same way as described in Composition 67 except that calcium tungstate powder was added in an amount of 4.0% by weight to the aluminum nitride powder used in Composition 67 and firing was conducted at 1700° C.

The sintered body thus obtained was black in color and its thermal density was as low as 100 W/m.K.

COMPOSITION 96

(Comparative Example)

A comparative sintered body was prepared in the same way as set forth in Composition 67 except that 4.5% by weight of calcium carbonate powder and 2.5% by weight of yttrium powder were added to the aluminum nitride powder used in Composition 67 and sintering was carried out at 1700° C. The sintered body thus obtained had a light transmitting ability and was unevenly colored in light gray.

COMPOSITION 97

(Comparative Example)

A comparative sintered body was prepared from aluminum nitride powder in the same way as set forth in Composition 74 except that sintering was carried out at 1800° C. for three hours without using any sintering aid. The resulting sintered body was white in color and was hardly densified.

COMPOSITION 98

(Comparative Example)

A comparative sintered body was prepared in the same way described in Composition 74 except that $CaCO_3$ powder was added in an amount of 1.0% by weight (calculated as CaO) to the aluminum nitride powder used in Composition 74 and sintering was conducted at 1800° C. for 3 hours. The sintered body thus obtained was gray in color and unevenly sintered portions were observed in the sintered body. Further, small pores were observed on the surface of the sintered body.

COMPOSITION 99

(Comparative Example)

A comparative sintered body was prepared in the same way as described in Composition 74 except that yttrium oxide powder was added in an amount of 1.0% by weight to the aluminum nitride powder used in Composition 74 and sintering was conducted at 1800° C. for three hours. The sintered body thus obtained had a slight light transmittance and was light brown in color. In some portions, uneven coloration was observed.

COMPOSITION 100

(Comparative Example)

A comparative sintered body was prepared in the same way as described in Composition 74 except that $WO_3$ powder was added in an amount of 3.0% by weight to the aluminum nitride powder used in Composition 74 and sintering was conducted at 1800° C. for three hours. The sintered body thus obtained was light brown in color and uneven sintering and coloration were observed.

COMPOSITION 101

(Comparative Example)

A comparative sintered body was prepared in the same way as set forth in Composition 74 except that 4.0% by weight of $CaWO_4$ powder and 1.0% by weight of $Y_2O_3$ powder were added to the aluminum nitride powder used in Composition 74 and sintering was conducted at 1600° C. for three hours. The aluminum nitride sintered body thus obtained was black.

atures and their thermal conductivity was low as compared to the sintered bodies of the present invention.

TABLE 5

| Composition No. | Amounts of sintering aids (by wt. %) | | | | Sintering conditions | | Color | Density g/cc | Thermal conductivity W/m.K |
|---|---|---|---|---|---|---|---|---|---|
| | CaWO$_4$ | Ca$_3$WO$_6$ | CaMoO$_4$ | Y$_2$O$_3$ | Firing temperature °C. | Holding time Hr. | | | |
| Examples of the Invention | | | | | | | | | |
| 67 | 4.0 | | | 1.0 | 1700 | 3 | Black | 3.31 | 120 |
| 68 | 0.1 | | | 5.0 | 1800 | 3 | Black | 3.32 | 180 |
| 69 | 0.5 | | | 5.0 | 1750 | 3 | Black | 3.31 | 170 |
| 70 | 1.0 | | | 5.0 | 1700 | 3 | Black | 3.30 | 150 |
| 22 | 1.5 | | | 3.5 | 1700 | 15 | Black | 3.31 | 170 |
| 71 | 3.0 | | | 5.0 | 1650 | 3 | Black | 3.34 | 130 |
| 72 | 4.0 | | | 1.0 | 1600 | 3 | Black | 3.28 | 100 |
| 73 | 10.0 | | | 5.0 | 1650 | 3 | Black | 3.45 | 100 |
| 74 | | 4.0 | | 0.1 | 1700 | 3 | Black | 3.27 | 125 |
| 75 | | 0.1 | | 0.2 | 1700 | 3 | Black | 3.22 | 95 |
| 76 | | 0.1 | | 1.0 | 1700 | 3 | Black | 3.27 | 130 |
| 77 | | 1.0 | | 1.0 | 1700 | 3 | Black | 3.27 | 135 |
| 78 | | 4.0 | | 1.0 | 1700 | 3 | Black | 3.29 | 130 |
| 79 | | 7.0 | | 1.0 | 1700 | 3 | Black | 3.29 | 120 |
| 80 | | 10.0 | | 1.0 | 1700 | 3 | Black | 3.28 | 105 |
| 81 | | 2.5 | | 2.5 | 1700 | 3 | Black | 3.29 | 145 |
| 21 | | 2.5 | | 2.5 | 1700 | 15 | Black | 3.30 | 165 |
| 82 | | 0.1 | | 5.0 | 1700 | 3 | Black | 3.04 | 110 |
| 83 | | 4.0 | | 5.0 | 1700 | 3 | Black | 3.33 | 130 |
| 84 | | 10.0 | | 5.0 | 1700 | 3 | Black | 3.37 | 115 |
| 85 | | 7.0 | | 7.0 | 1700 | 3 | Black | 3.41 | 115 |
| 86 | | 10.0 | | 10.0 | 1700 | 3 | Black | 3.51 | 90 |
| 87 | | 4.0 | | 0.1 | 1600 | 3 | Black | 3.24 | 115 |
| 88 | | 1.0 | | 1.0 | 1600 | 3 | Black | 3.21 | 120 |
| 89 | | 4.0 | | 1.0 | 1600 | 3 | Black | 3.25 | 115 |
| 90 | | 7.0 | | 1.0 | 1600 | 3 | Black | 3.24 | 95 |
| 91 | | 4.0 | | 1.0 | 1550 | 3 | Black | 3.07 | 90 |
| 34 | | | 1.5 | 3.5 | 1700 | 3 | Black | 3.31 | 140 |
| 37 | | | 2.5 | 2.5 | 1700 | 3 | Black | 3.30 | 130 |
| 46 | | | 4.5 | 0.5 | 1700 | 3 | Black | 3.28 | 105 |
| Comparative Examples | | | | | | | | | |
| 92 | (WO$_3$) 3.0 | | | | 1900 | 3 | Dark gray | 3.20 | 55 |
| 93 | | | | 5.0 | 1800 | 3 | Light brown | 3.32 | 170 |
| 94 | (WO$_3$) 4.0 | | | 5.0 | 1700 | 3 | — | undensified | — |
| 95 | 4.0 | | | | 1700 | 3 | Black | 3.30 | 100 |
| 96 | (CaCO$_3$) 4.5 | | | 2.5 | 1700 | 3 | Light gray | 3.26 | 120 |
| 97 | | | | | 1800 | 3 | White | 2.53 | 25 |
| 98 | (CaO) 1.0 | | | | 1800 | 3 | Gray | 3.18 | 49 |
| 99 | | | | 1.0 | 1800 | 3 | Light brown | 3.25 | 65 |
| 100 | (WO$_3$) 3.0 | | | | 1800 | 3 | Light brown | 2.98 | 34 |
| 101 | 4.0 | | | 1.0 | 1600 | 3 | Black | 3.28 | 100 |
| 102 | | 5.0 | | | 1600 | 3 | Black | 3.18 | 99 |
| 66 | | | 5.0 | 5.0 | 1700 | 3 | Black | 3.33 | 100 |

COMPOSITION 102

(Comparative Example)

A comparative sintered body was prepared in the same way as set forth in Composition 74 except that 5.0% by weight of Ca$_3$WO$_6$ powder was added to the aluminum nitride powder used in Composition 74 and sintering was conducted at 1600° C. for three hours. The aluminum nitride sintered body thus obtained was black.

Density and thermal conductivity were measured for the respective sintered bodies of aluminum nitride obtained from Comparative Compositions 92 to 102 as stated in the foregoing Examples of the present invention and the results obtained are given in Table 5. For comparison, the data of Composition 66 are also shown in the same Table. It is apparent that most of the comparative sintered bodies required high sintering temperatures and their thermal conductivity was low as compared to the sintered bodies of the present invention.

As described above, the sintered bodies of aluminum nitride in accordance with the present invention have a high density and a good thermal conductivity and, if necessary, the sintered bodies can be uniformly colored in black to achieve a superior light shielding ability. Further, the aluminum nitride sintered bodies of the present invention can be produced at relatively low sintering temperatures of not higher than 1800° C. and this is industrially very advantageous from the viewpoint of productivity and cost. Such advantages not only make the sintered bodies suitable for practical use in insulating substrates, heat sinks, packages for semiconductor devices, but also lead to further expanded applications of them, for example, in co-fired type substrate application where substrate materials are co-fired with conductor materials to be bonded.

What is claimed is:

1. A sintered body of aluminum nitride produced by adding a sintering aid to aluminum nitride to form a composition consisting essentially of said aluminum nitride and said sintering aid, said sintering aid being selected from the group consisting of (a) a mixture of (i) calcium oxide, (ii) yttrium oxide and (iii) at least one additional oxide selected from the group consisting of tungsten oxide and molybdenum oxide, (b) a mixture of (i) a composite oxide of calcium and at least one element selected from the group consisting of tungsten and molybdenum, and (ii) yttrium oxide, and (c) a mixture of a calcium compound, a yttrium compound and at least one additional compound selected from the group consisting of tungsten compounds and molybdenum compounds, wherein said compounds are capable of being converted into said mixture (a) or said mixture (b) by sintering, the amount of said sintering aid, calculated as CaO, $Y_2O_3$, $WO_3$ and $MoO_3$, being from 0.1 to 20 wt. %, based on the total weight of said composition, said sintering aid containing at least 0.03 wt. % of $Y_2O_3$, 0.02 wt. % of CaO and 0.05 wt. % of at least one of $WO_3$ and $MoO_3$, based on the total weight of said composition, then molding said composition and sintering the molded composition in a nonoxidizing atmosphere or in a vacuum.

2. A sintered body of aluminum nitride as claimed in claim 1 in which said sintering aid consists of said mixture (b) and said mixture (b) contains one or more of $CaWO_4$, $Ca_3WO_6$, $Ca_3MoO_6$ and $CaMoO_4$.

3. A sintered body of aluminum nitride as claimed in claim 1 in which the total amount of said sintering aid is in the range of 0.2 to 15% by weight, calculated as CaO, $Y_2O_3$, $WO_3$, and $MoO_3$, based on the total weight of the composition.

4. A sintered body of aluminum nitride as claimed in claim 3 in which the minimum amounts of said sintering aids are 0.5% for $Y_2O_3$, 0.05% for CaO and 0.3% for one or more of $WO_3$ and $MoO_3$.

5. A sintered body of aluminum nitride as claimed in claim 1 in which the total amount of one or more of $WO_3$ and $MoO_3$ is at least 0.1% by weight.

6. A sintered body of aluminum nitride as claimed in claim 1 in which the total amount of one or more of $WO_3$ and $MoO_3$ is at least 0.3% by weight.

7. A sintered body of aluminum nitride as claimed in claim 1 in which the amount of $Y_2O_3$ is in the range of 0.5 to 7% by weight.

8. A sintered body of aluminum nitride as claimed in claim 1 in which the amount of $Y_2O_3$ is in the range of 1 to 5% by weight.

9. A sintered body as claimed in claim 1 in which said sintering aid is a mixture of yttrium oxide and a material selected from the group consisting of $CaWO_4$, $Ca_3WO_6$, $Ca_3MoO_6$ and mixtures thereof.

10. A sintered body as claimed in claim 1 in which said sintering aid is a mixture of a yttrium compound selected from the group consisting of $Y_2O_3$, $Y_2CO_3$, $Y(NO_3)_3$, $Y(CH_3COO)_3$ and $Y(C_2O_4)_3$ a calcium compound selected from the group consisting of CaO, $CaCO_3$, $Ca(NO_3)_2 \cdot 4H_2O$ and $CaC_2O_4 \cdot H_2O$, and at least one additional compound selected from the group consisting of $WO_3$, $H_2WO_4$, $MoO_3$ and $H_2MoO_4$.

11. A sintered body as claimed in claim 1, consisting essentially of aluminum nitride, $Y_2O_3$-$Al_2O_3$ compound, CaO-$Al_2O_3$ compound, and finely dispersed metal selected from the group consisting of molybdenum metal, tungsten metal and both of said metals.

* * * * *

UNITED STATES PATENT AND TRADEMARK OFFICE
CERTIFICATE OF CORRECTION

PATENT NO. : 4,833,108

DATED : May 23, 1989

INVENTOR(S) : Shinya MIZUNO et al

It is certified that error appears in the above-identified patent and that said Letters Patent is hereby corrected as shown below:

Column 18, line 20; after "$Ca_3MoO_6$" insert --, $CaMoO_4$--.

line 24; after "$Y(C_2O_4)_3$" insert a comma.

Signed and Sealed this

Eighth Day of May, 1990

Attest:

HARRY F. MANBECK, JR.

*Attesting Officer*   *Commissioner of Patents and Trademarks*